United States Patent
Hussain et al.

(10) Patent No.: US 10,869,275 B2
(45) Date of Patent: Dec. 15, 2020

(54) MICROSLEEP FOR MACHINE-TYPE COMMUNICATION DEVICES

(71) Applicant: Apple Inc., Cupertino, CA (US)

(72) Inventors: Awais M. Hussain, Milpitas, CA (US); Tarik Tabet, Los Gatos, CA (US); Lydi Smaini, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/053,103

(22) Filed: Aug. 2, 2018

(65) Prior Publication Data
US 2019/0045447 A1 Feb. 7, 2019

Related U.S. Application Data

(60) Provisional application No. 62/541,182, filed on Aug. 4, 2017.

(51) Int. Cl.
*H04W 52/02* (2009.01)
*H04L 25/02* (2006.01)
*H04W 4/70* (2018.01)

(52) U.S. Cl.
CPC ..... *H04W 52/0241* (2013.01); *H04L 25/0216* (2013.01); *H04L 25/0224* (2013.01); *H04W 4/70* (2018.02)

(58) Field of Classification Search
CPC ... H04W 52/00; H04W 52/0241; H04W 4/70; H04W 24/02; H04W 24/04; H04W 24/008; H04W 24/10; H04W 64/003; H04L 25/0216; H04L 25/0224
See application file for complete search history.

(56) References Cited

U.S. PATENT DOCUMENTS

| | | | |
|---|---|---|---|
| 9,398,577 B2 | 7/2016 | Park | |
| 9,942,852 B2* | 4/2018 | Hsu | H04W 52/0258 |
| 10,645,681 B2* | 5/2020 | Chen | H04L 5/0087 |
| 10,660,033 B2* | 5/2020 | Li | H04W 74/04 |
| 2011/0176466 A1* | 7/2011 | Lindoff | H04W 52/0238 370/311 |
| 2013/0301434 A1* | 11/2013 | Krishnamurthy | H04L 1/0026 370/252 |
| 2013/0301501 A1* | 11/2013 | Olvera-Hernandez | H04W 52/0216 370/311 |
| 2014/0036747 A1* | 2/2014 | Nory | H04W 74/0833 370/311 |
| 2016/0345118 A1* | 11/2016 | Oh | H04W 4/70 |
| 2017/0265171 A1 | 9/2017 | Rico Alvarino | |
| 2017/0303192 A1 | 10/2017 | Sun | |
| 2018/0262937 A1* | 9/2018 | Lee | H04B 17/309 |
| 2019/0036647 A1* | 1/2019 | Gowda | H04L 1/0053 |
| 2019/0124625 A1* | 4/2019 | Takeda | H04W 48/16 |

(Continued)

FOREIGN PATENT DOCUMENTS

WO WO2017050512 3/2017

*Primary Examiner* — Candal Elpenord
(74) *Attorney, Agent, or Firm* — Kowert, Hood, Munyon, Rankin & Goetzel, P.C.

(57) ABSTRACT

This disclosure relates to techniques for selecting operational modes of a wireless device. The operational mode may be selected based on determining the presence or absence of reference symbols. A low power mode may be selected when the presence or absence of reference symbols suggests that a control channel used by the wireless device may not be present.

20 Claims, 6 Drawing Sheets

(56) References Cited

U.S. PATENT DOCUMENTS

2019/0297577 A1* 9/2019 Lin ................ H04W 52/0216
2020/0077338 A1* 3/2020 Sui ................ H04W 52/0229

* cited by examiner

MICROSLEEP FOR MACHINE-TYPE COMMUNICATION DEVICES

PRIORITY CLAIM

This application claims priority to U.S. provisional patent application Ser. No. 62/541,182, entitled "Microsleep for Machine-type Communication Devices," filed Aug. 4, 2017, which is hereby incorporated by reference in its entirety as though fully and completely set forth herein.

TECHNICAL FIELD

The present application relates to wireless communication, including to techniques for selecting an operational mode to decode control channel information.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". Many such devices have relatively limited wireless communications capabilities and typically have smaller batteries than larger portable devices, such as smart phones and tablets. In general, it would be desirable to recognize and provide support for the relatively limited wireless communication capabilities of such devices. Therefore, improvements in the field are desired.

SUMMARY

Embodiments are presented herein of, inter alia, systems, apparatuses, and methods for wireless devices to reduce their power consumption when there is no control channel information to be decoded.

In at least some instances, cellular communication systems may utilize multiple types of control channels and/or multiple types of reference signals. For example, in certain LTE releases, in addition to a physical downlink control channel (PDCCH) and cell-specific reference symbols (CRS), a machine-type communication physical downlink control channel (MPDCCH) and demodulation reference symbols (DMRS) may be provided on at least some occasions.

It may be the case that a cellular base station does not transmit control channel information on the resources assigned to a control channel at every opportunity. For example, according to some embodiments, the MPDCCH may not be transmitted if there is no control information to be distributed on that particular control channel at a given time. In such instances, the base station may instead use those resources for other purposes (e.g., for a physical downlink shared channel, among various possibilities). Further, at least in some such instances, the base station may also repurpose resources that are associated with a type of reference signals associated with that control channel (e.g., DMRS resources in the case of the MPDCCH not being transmitted).

Accordingly, it may be possible for a wireless device to determine if such a control channel is absent if the resources associated with the type of reference signals associated with that control channel do not actually include the reference signals. If such a determination can be made within an initial portion of a time period in which a control channel communication might be performed, the wireless device may in turn be able to enter a reduced power mode (e.g., sleep) for the remaining portion of that time period, e.g., since there may be no control information for the wireless device in that case.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices. Among various other possibilities, the techniques described herein may be implemented in conjunction with standards such as LTE category M1 (e.g., LTE CAT-M or LTE-M).

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
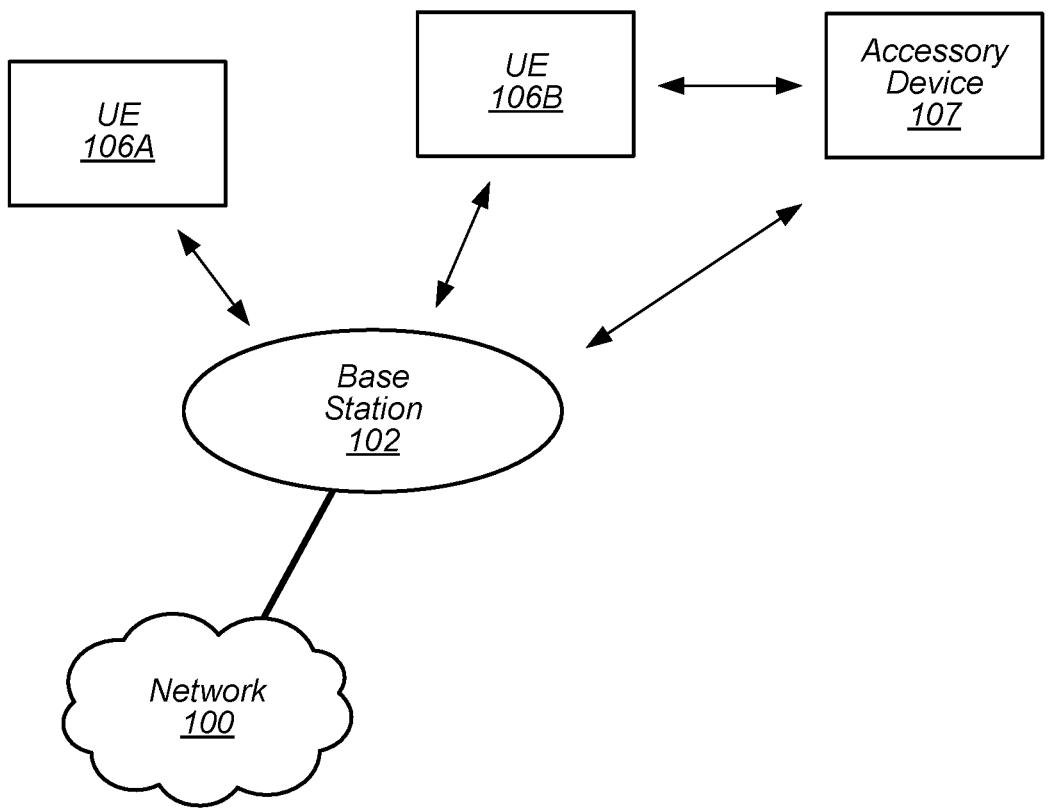
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

CE: Coverage enhancement
CHEST: Channel estimate
CIR: Channel impulse response
CRS: Cell-specific reference symbol
CSS: Common search space
DCI: Downlink control information
MTC: Machine type communication
MPDCCH: MTC-PDCCH
OTA: Over the air
PDCCH: Physical downlink control channel
PRB: Physical resource block
RE: Resource element
RS: reference symbol
DMRS: Demodulation reference symbol
USS: UE-specific search space Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently (e.g., permanently, e.g., due to a hardware limitation of the device) link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
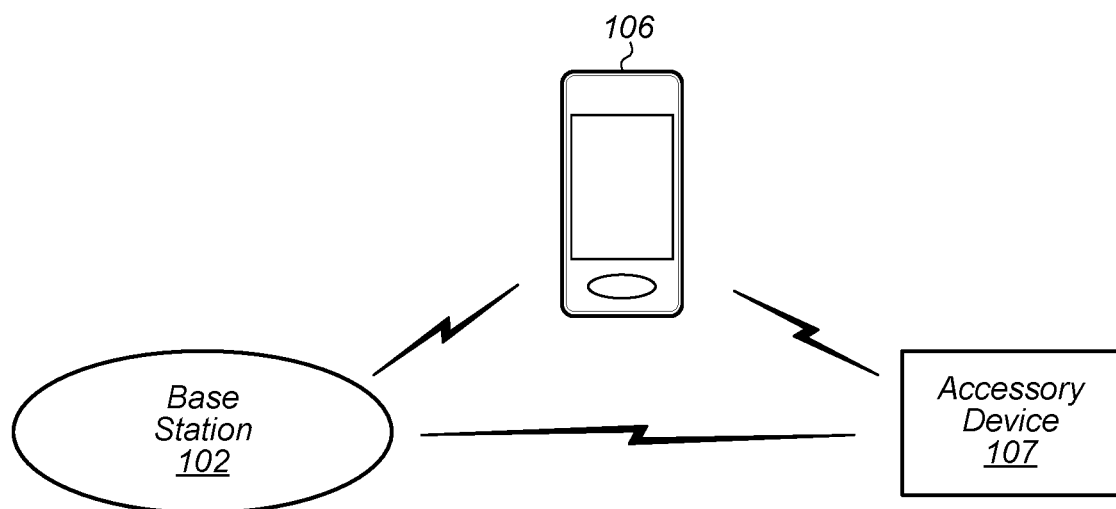
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, LTE-M, HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-B and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, WiMAX, LTE, LTE-A, NR, LTE-M, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processing elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, have a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited or no cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
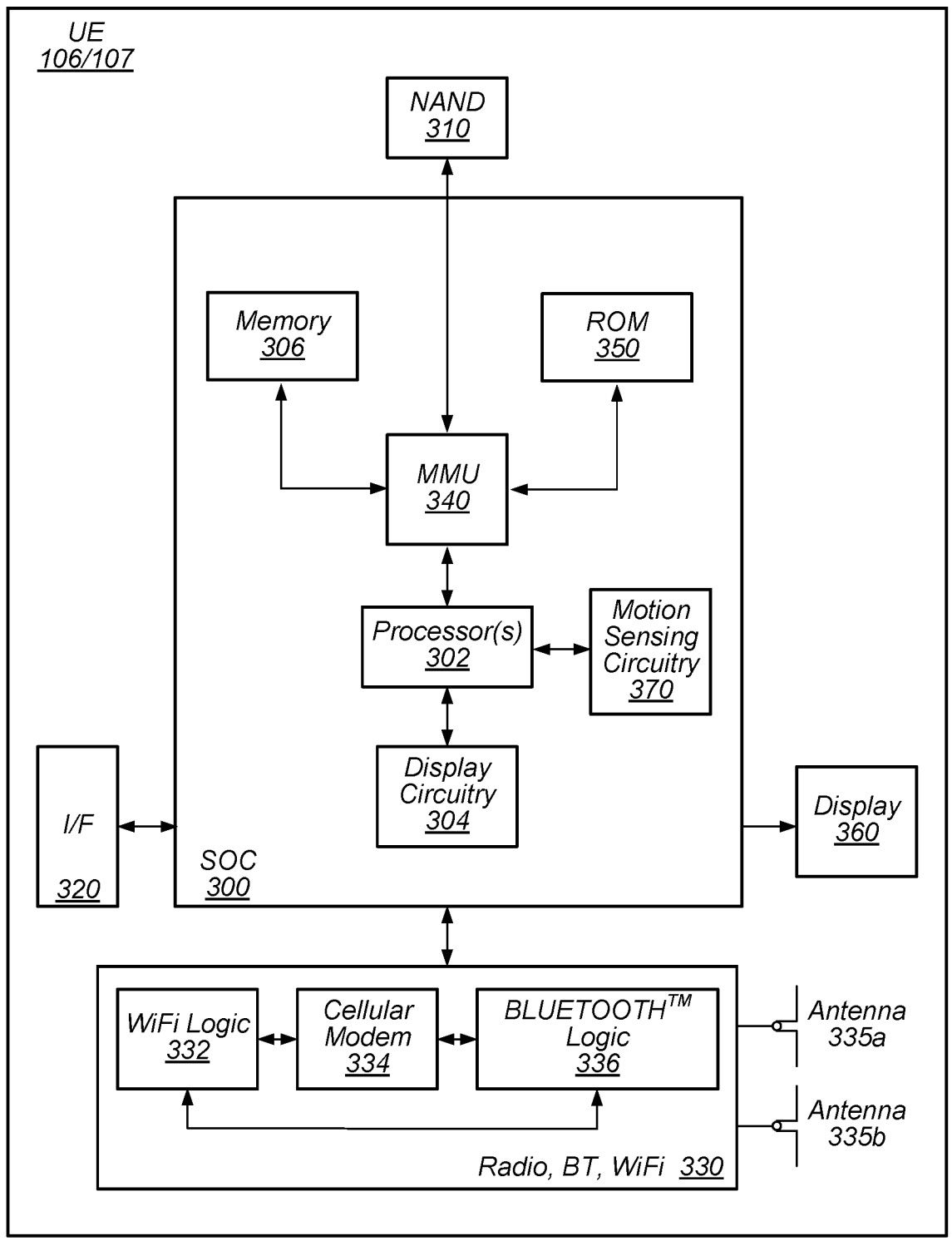
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, LTE-M, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
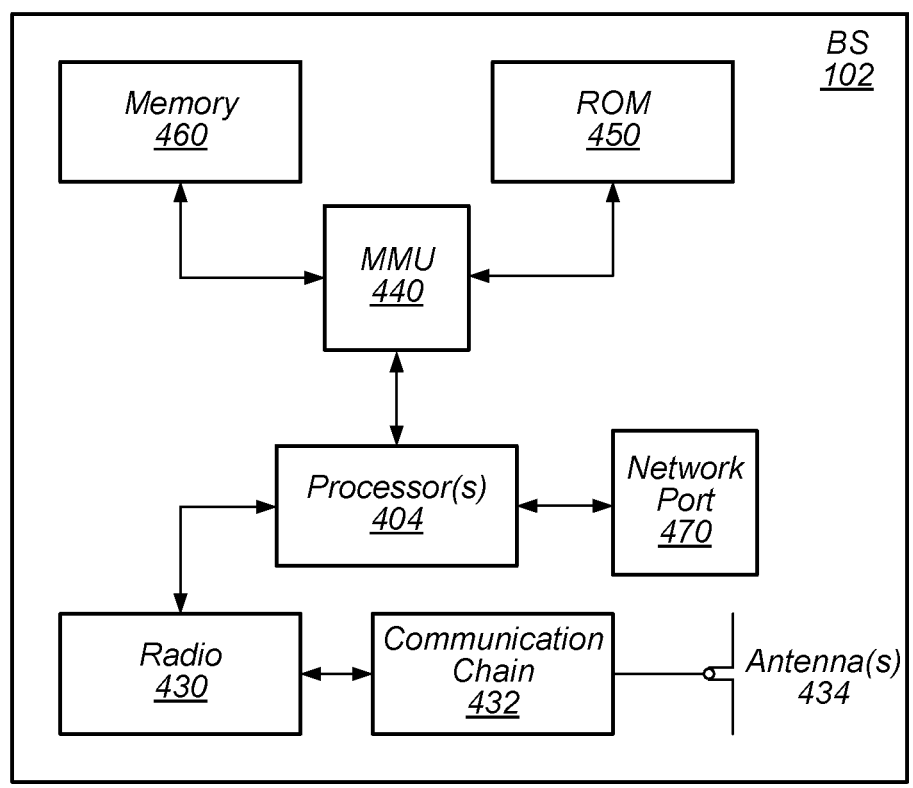
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
FIG. 5 illustrates examples of possible normal and extended/enhanced coverage cell ranges, according to some embodiments.

FIG. 5—Example Coverage Modes

As cellular communication technologies evolve, an increasing number of cellular communication capable devices are expected to be deployed. One of the reasons for the continuing increase in the numbers of devices includes the development and spread of devices performing machine type communication (MTC). Such devices, which may include stationary deployed devices, wearable devices, and/or other devices forming part of the "Internet of Things", may commonly be designed to perform frequent and/or periodic small data transmissions.

In view of the potentially more limited expected usage scenarios for many such devices, devices primarily expected to perform MTC may commonly be lower-complexity devices than many other common cellular devices (e.g., handheld cellular phones, etc.), for example to reduce the size, cost of manufacture, and/or cost to the consumer of such devices. Accordingly, in many instances the communication capability (e.g., number and/or power level of antennas, battery capability, communication range, etc.) of such devices may be relatively limited. For example, many such devices may be considered link budget limited devices.

This may present difficulties in a wireless communication system that primarily supports wireless devices with greater communication capability. Accordingly, at least some wireless communication technologies (e.g., standards) are being revised and/or developed in a manner to support link budget limited devices (e.g., in addition to those wireless devices that are not link budget limited).

For example, at least some cellular communication systems may be capable of providing multiple coverage modes, e.g., to help accommodate wireless devices with different communication capabilities and/or operating in different radio conditions. Such coverage modes could include a normal coverage mode (e.g., for wireless devices experiencing good radio conditions) along with one or more enhanced coverage modes (e.g., for wireless devices experiencing varying degrees of poorer radio conditions, whether as a result of inherent device capabilities, current conditions, or some combination thereof), as one possibility. FIG. 5 illustrates one example of possible different approximate coverage ranges associated with different coverage modes that could be offered by a cellular base station operating in a cellular communication system, according to some embodiments. As shown, in this example, for a link budget limited device the communication range at normal coverage may be limited to an inner region 502 of the cell, but in enhanced coverage mode the range may extend to cover a larger region 504 of the cell. At least in some instances, any or all of the features of the different coverage modes may differ, including but not limited to communication bandwidth, maximum uplink throughput, maximum downlink throughput, and/or any of various other features.

In many instances, a wireless device may predominantly or exclusively operate in just one of the coverage modes offered; for example, a MTC device in a stationary deployment might always operate in an enhanced coverage mode based on its particular combination of device characteristics and typical radio conditions with its serving cell, as one possibility.

One feature that may differ between such different coverage modes, at least according to some embodiments, may include a type of control channel that is used to schedule uplink and/or downlink communications for a wireless device. For example, as one possibility, the 3GPP release (rel.) 13 normal coverage mode may typically use a physical downlink control channel (PDCCH) that may span up to 20 MHz for paging (e.g., when in idle mode) and/or to provide uplink and downlink grants to a wireless device (e.g., when in connected mode), while the 3GPP rel. 13 CE mode may typically use a MTC PDCCH (MPDCCH) that may span 1.4 MHz for paging and/or to provide uplink and downlink grants to a wireless device. In this example, a wireless device that is in normal coverage mode, may listen for pages on the PDCCH when in idle mode, and a wireless device that is in enhanced coverage mode may listen for pages on the MPDCCH.

As described above, both the PDCCH and MPDCCH may be used to schedule uplink and/or downlink communications. Such scheduling may be referred to as downlink control information (DCI).

FIG. 6—Flowchart

Figure 6:
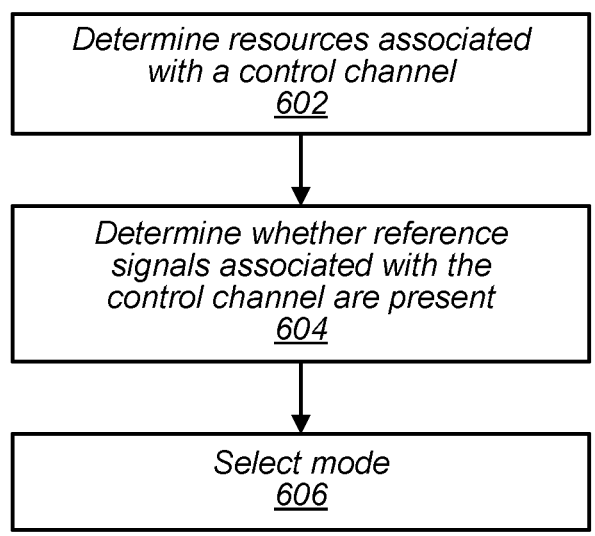
FIG. 6 is a flowchart diagram illustrating an example method for mode selection based on a determined presence or absence of certain reference symbols, according to some embodiments.

FIG. 6 is a flowchart diagram illustrating one possible example of a method for determining resources associated with a control channel, determining the presence or absence of reference symbols, and selecting an operating mode based on the presence or absence of reference symbols, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 6 may be implemented by a wireless device, such as a UE 106 or 107 illustrated in and described with respect to FIGS. 1-3, or more generally in conjunction with any of the computer systems or devices shown in the above Figures, among other devices, as desired. For example, aspects of the method of FIG. 6 may be implemented by MTC devices and/or link budget limited devices. Note that while at least some elements of the method of FIG. 6 are described in a manner relating to the use of communication techniques and/or features associated with LTE and/or 3GPP specification documents, such description is not intended to be limiting to the disclosure, and aspects of the method of FIG. 6 may be used in any suitable wireless communication system, as desired. As shown, the method may operate as follows.

In 602, a wireless device may determine resources associated with a control channel. For example, according to some embodiments, the wireless device may utilize cellular communication capability to attach to a cellular base station, and may obtain certain system information from the cellular base station (e.g., via broadcast system information and/or device-specific configuration information) indicating the resources assigned to a particular control channel (e.g., or multiple channels).

The cellular communication system may utilize Orthogonal Frequency-Division Multiplexing (OFDM) (e.g., at least in the downlink), at least according to some embodiments. For example, the frequency resources provided by the base station may be denominated in sub-carriers, and the time resources provided by the base station may be denominated in OFDM symbols, such that a single subcarrier in a single OFDM symbol may be referred to as a "resource element", and a group of a specific number of contiguous subcarriers (e.g., 12) and a specific number of contiguous OFDM symbols (e.g., 7, or one "slot") may be referred to as a "physical resource block" ("PRB"), as one possibility. Additionally, at least in some instances, a subframe may be defined as including two slots (e.g., a first slot and a second slot). Two slots (e.g., and 12 subcarriers) may be referred to as a PRB pair. Note that other configurations are also possible, e.g., according to various possible technical specifications, network configurations, base station configurations, etc. These OFDM symbols may have specified locations in both the time and frequency domains. These resource elements may be referred to as PRBs, PRB resources, time-frequency resources, etc., among various possible terms.

According to some embodiments, the cellular base station may provide (or be capable of providing) multiple control channels, such as a PDCCH and a MPDCCH, e.g., in certain LTE deployments. In such a scenario, each of the PDCCH and MPDCCH may be associated with certain resource elements of the cellular base station's system resources, as described above. For example, the PDCCH may be contained in up to the first 3 symbols of a subframe across the entire system bandwidth, according to some embodiments, while the resources associated with the MPDCCH may be dynamically assigned (e.g., and indicated in broadcast system information and/or indicated to wireless devices in the system using configuration information, e.g., in a system information block), typically in one or more narrowband portions of the system bandwidth.

In some instances, control information may be provided (or not provided) on a control channel in alignment with certain control channel communication periods. For example, at least in the case of the MPDCCH, certain start locations (e.g., specified subframe numbers) may be indicated by the cellular base station, such that DCI communications may begin on the MPDCCH only at those specified start locations. Further, a control channel communication period may extend for various possible durations in time.

For example, while as one possibility a MPDCCH communication period may last for a single subframe, it may also be possible for redundancy in time to be configured for the MPDCCH, and in such instances a MPDCCH communication period may last for multiple subframes. According to some embodiments, determining the resources associated with a control channel may include either or both of determining the specific resource elements on which the control channel would be provided (e.g., if present), or determining the control channel communication period(s) associated with the control channel.

Thus, the wireless device may determine the resources (e.g., time-frequency resources) associated with the control channel in any combination of frequency (e.g., frequency-domain or frequency-space) and time (e.g., time-domain or time-space). For example, the method may include considering an individual subframe, a slot or symbol (e.g., or set of symbols) of a subframe, or multiple consecutive subframes, concurrently or sequentially. Similarly, the method may include considering a single subcarrier or multiple subcarriers. Similarly, the method may include considering a single PRB, a single PRB pair, or multiple PRBs or PRB pairs.

As noted above, control channels may carry DCI. The DCI information may be repeated at various time and frequency locations, based on certain parameters. For example, aggregation level "L" may determine the redundancy resources (in frequency space) used for DCI carried in a MPDCCH. Similarly, (e.g., for CE mode devices, according to some embodiments), the MPDCCH may extend over multiple subframes. Thus, the concept of repetition levels ("R") (redundancy in time) may also be used.

Thus, as one possible way of defining a control channel communication period, along with start locations, a set of parameters (e.g., L and R) may determine the search space for blind decoding of DCI in both time and frequency for a given control channel (e.g., the MPDCCH).

Control channel information, (e.g., DCI) may be provided in a common search space (CSS) that is available to all UEs. The CSS may be monitored by UEs not in the network. Additionally, or alternatively, control channel information may be provided in a user-specific search space (USS) that is intended for specific UEs that are in the network. However, in at least some configurations, the resources associated with a control channel may be used to carry other information (e.g., application data, or control information for other devices). For example, if there is no control information to be provided in a particular control channel communication period, the base station may use the resources associated with the control channel for other purposes, and may not transmit the control channel in that particular control channel communication period.

Absent any techniques for determining when a control channel is present and when it is absent, a wireless device may attempt to perform blind decoding of the search space even when no DCI (e.g., or no user-specific DCI) is present in the search space. Such attempted decoding may require both time and energy. Under circumstances wherein this decoding occurs without DCI (e.g., or without user-specific DCI) present, the time and energy spent on the decoding may effectively be wasted.

At least according to some embodiments, the cellular base station may provide reference signals in conjunction with its downlink communications, e.g., to assist wireless devices with channel estimation to better enable the wireless devices to receive and decode the downlink communications. In at least some instances, multiple types of reference signals may be used, for example in conjunction with the different possible control channels. Such reference symbols may be transmitted in a specific (e.g., known) portion of the resources associated with the control channel. Accordingly, in a scenario in which a base station chooses not to transmit a control channel during a particular control channel communication period, the base station may also be able to omit transmission of a type of reference signals associated with that control channel during that control channel communication period (e.g., so that those resources can be used for other purposes). Accordingly, the presence, (e.g., or the absence), of certain types of reference symbols may be an indicator of whether a control channel is actually carried by the resources associated with the control channel during a particular time period.

Thus, in 604, the wireless device may determine whether reference signals (e.g., of a particular type) are present during a certain time period (e.g., and certain frequency space). The presence or absence of reference symbols during the selected time period may be determined in any of various ways, as discussed below.

The method contemplates determining the presence or absence of any type (e.g., or types) of reference symbols that may be useful for judging the presence or absence of one or more control channels. In particular, in the exemplary case of the MPDCCH in certain LTE communication systems, the absence of demodulation reference symbols (DMRS) may be a reliable indicator that MPDCCH is not present in the associated resources. In other words, a negative criterion for the presence of MPDCCH may be the absence of DMRS. Stated still differently, the absence of DMRS may imply the absence of MPDCCH. However, the converse or inverse of this criterion may not hold true (e.g., presence of DMRS may not necessarily imply presence of MPDCCH). It will be appreciated that numerous other examples are contemplated. As a still further example, in the case of MPDCCH, DMRS symbols in the USS may be scrambled with a random sequence specific to a UE or group of UEs. Thus, for example, the presence of control symbols with a specific random sequence may imply the presence of USS MPDCCH. Moreover, the method may apply to other control channels. Additionally, the method may apply to other types (e.g., or sub-types) of reference symbols. Still further, the method may apply to other relationships between reference symbols and control channels. The method may apply to relationships between the presence/absence of one or multiple types of reference symbols to one or multiple control channels. For example, the method may include more complex relationships, such as: the presence of reference symbol type-A in combination with the absence of reference symbol type-B implies the absence of control channels C and D.

Various technical standards and/or network designs may describe the use of one or more of various types of reference symbols. For example, DMRS may be used in combination with MPDCCH. As a further example, many technologies use cell-specific reference symbols (CRS) (sometimes referred to as cell-specific reference signals). CRS may be commonly used with PDCCH and PDSCH, for example. Other common types of reference symbols may include CSI reference signals/symbols (CSI-RS), UE-specific reference signals/symbols, and positioning reference signal/symbols (PRS). The method may be used with any type (e.g., or types) of reference symbols/signals.

For example, some networks may use both CRS and DMRS. CRS may support the PDCCH and DMRS may support the MPDCCH, as one possibility. Cells in those networks may transmit CRS consistently, regardless of the content of PDCCH or the presence (or absence) or content of the MPDCCH. However, those cells may not transmit DMRS in certain circumstances, e.g., when the MPDCCH is not present.

Reference symbols of specific types may be detected (e.g., the presence or absence of reference symbols may be determined) in any of various ways. For example, one technique may rely on channel estimation based on one type of reference symbol in comparison to channel estimation based on another type of reference symbol. For example, as described above some cells may consistently transmit CRS and may intermittently transmit DMRS. Thus, in order to determine the presence of DMRS, a UE may determine a channel estimate based on CRS resource elements and a separate channel estimation based on the resource elements that potentially include DMRS. In the case that DMRS is present, the channel estimate based on the DMRS resource elements may be similar to the channel estimate based on CRS resource elements, e.g., such that one or more characteristics of each channel estimation may be within one or more predetermined or dynamically selected thresholds. Conversely, in the case that DMRS is not present, the channel estimate based on the DMRS resource elements may be substantially different from any channel estimate based on the CRS (and may be a poor representation of the communication channel), e.g., such that characteristics of the different channel estimations may not be within the one or more predetermined or dynamically selected thresholds. Such a (e.g., poor) DMRS-based channel estimate may thus be distinguishable from the CRS-based channel estimate.

Base stations may be equipped with multiple antennas and use multiple antennas to transmit reference symbols. For example, eNodeBs may have two or four antennas which may be used individually or beam-formed/pre-coded to transmit reference symbols, at least in some instances. Thus, at least in some instances, multiple channel estimates for each of the types of reference symbols may be determined.

Mathematically, this may be described as follows, e.g., for an example scenario in which an eNodeB uses four transmit antennas. Let $h_i$ be the interpolated/extrapolated channel estimates at the receiver based on CRS from the four eNodeB antennas, and let c be the channel estimate based on DMRS, then form correlation coefficients:

$$\rho_i = \frac{\langle c, h_i \rangle}{\|c\| \|h_i\|}, i = 0, 1, 2, 3$$

Based on the correlation coefficients, the UE may determine that DMRS are present if the magnitude(s) of one or more correlation coefficients are greater than some threshold(s). Such threshold(s) may be predetermined or may be determined based on current conditions, among other possible embodiments. This procedure may assume that the eNodeB transmit antennas are uncorrelated.

As another (additional or alternative) possibility, the presence/absence of a type of reference symbol may be determined by comparing the energies contained in the channel impulse responses (CIR) based on various reference symbol types (e.g., DMRS and CRS), and the noise variances, e.g., in the time domain.

Based at least in part on the determined presence or absence of reference symbols, the wireless device may select a mode in 606. Non-limiting examples of the selection process, timing, and possible modes are described below.

The mode (e.g., an operating mode, operational mode, power mode, etc.) may be selected so that resource elements associated with a control channel are decoded (or at least an attempt to decode them may be made) if the determination of the presence or absence of reference symbols implies that the control channel may be present (e.g., or if absence of the control channel is not implied). The mode may be selected so that such resource elements are not decoded if the absence of the control channel is determined (e.g., implied by absence of reference signals). Other selections/approaches may be implemented as desired.

Further, other factors, in addition to the determined presence/absence of reference symbols, may be used as desired. Such other factors may include current conditions, including radio link conditions, battery level, application activity, user activity, etc.

Possible modes may include various low power modes (e.g., a reduced power mode, sleep, a sleep state, microsleep, µSleep, or uSleep). Such low power modes may not allow for decoding of all resource elements. For example, a low power mode may comprise depowering portions of the receive circuitry of an apparatus such that resource elements associated with one or more control channels will not be decoded, and/or further that the wireless device does not attempt to decode any portion of the base station's downlink communications, e.g., for a specified period of time.

Other possible modes may include full power modes (e.g., or high power modes). Such modes may allow for attempting decoding of all resource elements, or may allow for decoding of more resource elements than the low power modes described above. Still other possible modes may be incorporated into the method as desired.

In at least some embodiments, a low power mode may be selected for use during a second period based at least in part on the determined absence of a specific type of reference symbols during a first period. For example, an apparatus that determines the absence of DMRS in the last two symbols of the first slot of a subframe (e.g., a first period) may select to sleep for most or all of the second slot of the subframe (e.g., a second period), and thus may not spend resources on attempting blind decoding of the control channel(s) during the second period. In contrast, an apparatus that determines the presence of DMRS (e.g., or does not determine the absence of DMRS) in the last two symbols of the first slot of a subframe may select a full power mode (e.g., select not to sleep) for most or all of the second slot of the subframe, and thus may attempt blind decoding of the control channel (s) during the second period.

In at least some embodiments, the length of a first period (e.g., the time and frequency wherein an apparatus determines the presence of reference symbols as in 604) and the length of a second period (e.g., the time and frequency wherein an apparatus operates in the selected mode) may be determined at least in part based on search parameters (e.g., L and/or R) and start locations, e.g., such that the wireless device determines whether reference symbols of a specific type are present or absent during an initial portion of a control channel communication period, then operates in the selected mode (e.g., sleeps or remains awake) for a subsequent (e.g., temporally) portion of the control channel communication period. For example, in the case of repetition level R>1 (e.g., wherein control channel information such as DCI is repeated), the apparatus may use a relatively longer first period in order to achieve a high confidence about the determined presence/absence of reference symbols. Further, the apparatus may correspondingly use a longer second period (e.g., multiple contiguous subframes), for example such that the second period extends to the end of the repetition of the control channel transmission.

Note that the method may be repeated as desired, e.g., over the course of multiple control channel communication periods. For example, in an initial portion of a first control channel communication period, the wireless device might determine that reference signals associated with a control channel are not present, and so the wireless device might go to sleep for the remainder of the first control channel communication period. Subsequently, in an initial portion of a second control channel communication period, the wireless device might determine that reference signals associated with the control channel are present, and so the wireless device might remain awake for the remainder of the first control channel communication period. Further, in this case, the wireless device might attempt blind decoding of the communication channel during the second control channel communication period, e.g., based at least in part on having determined that the reference signals associated with the control channel are present. Similarly, the wireless device might determine whether the reference signals associated with the control channel are present or absent in any number of additional control channel communication periods, and determine how to operate in each of those control channel communication periods, in an ongoing manner as part of its cellular communication with the cellular base station.

Thus, at least according to some embodiments, a wireless device may be able to reduce its power consumption using the method of FIG. 6. For example, by effectively determining that there is no downlink control information (DCI) incoming early in a control channel communication period, the wireless device may be able to reduce the power provided to certain components of the wireless device for the remainder of such a period without negatively impacting the ability of the wireless device to receive cellular communication (e.g., since there may be no communications intended for the wireless device during such a period).

Figure 7:
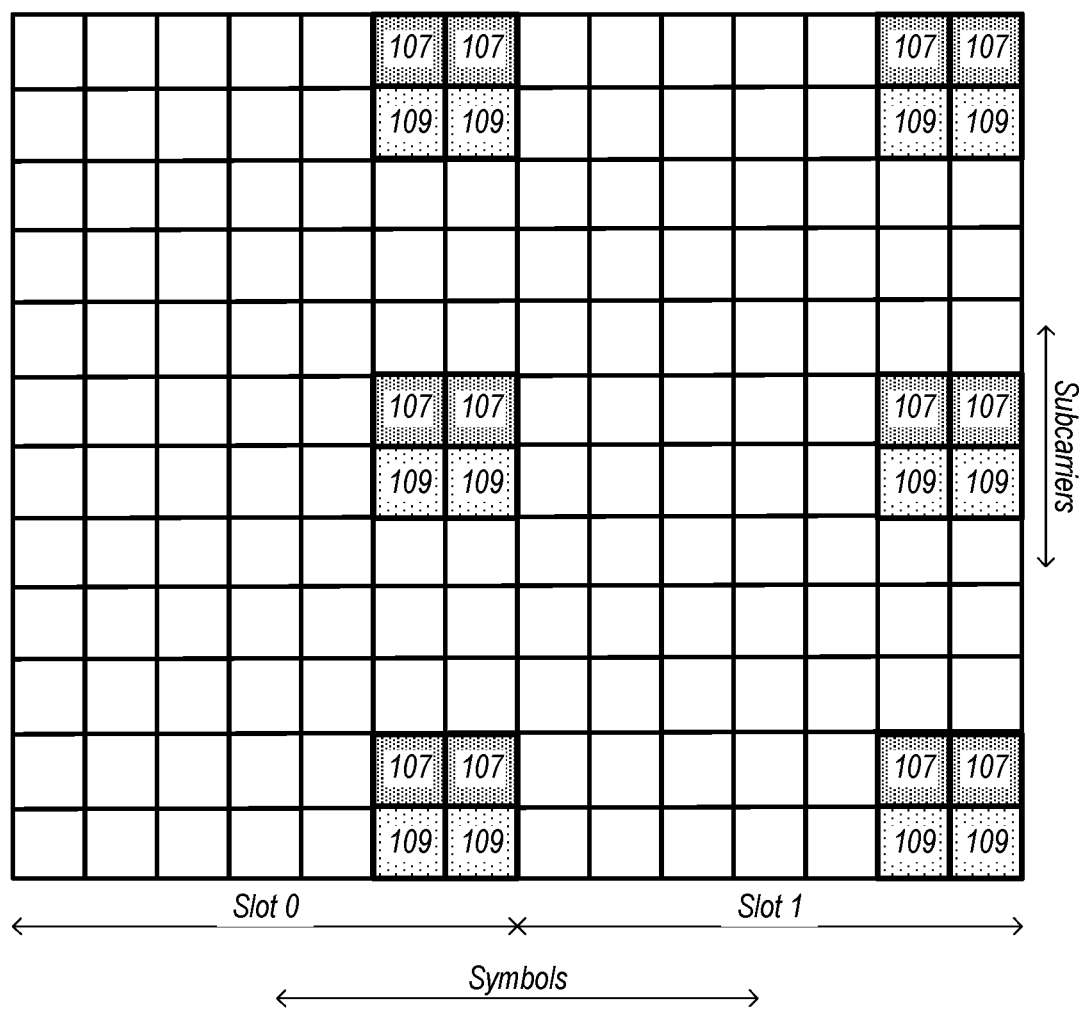
FIG. 7 illustrates an example subframe (e.g., PRB pair) with reference symbols, according to some embodiments.

FIG. 7—Example Subframe

FIG. 7 depicts an example subframe showing a possible configuration of DMRS resource elements in a PRB pair, according to some embodiments.

For distributed transmission, the resource elements may be transmitted according to the DMRS on ports 107 and 109. DMRS is shown on the last two symbols of each slot. Each port is shown on a set of three subcarriers among the twelve subcarriers in a PRB pair. The diagram shows a normal subframe, with a normal cyclic prefix.

As discussed above, in at least some embodiments, an apparatus that determines that there is no DMRS present in the illustrated resource elements of slot 0 may elect to sleep for some or all of slot 1.

Other Information

The following additional information is provided by way of example of various considerations and details relating to possible systems in which the method of FIG. 6 and/or other aspects of this disclosure may be implemented, and is not intended to be limiting to the disclosure as a whole. Numerous variations and alternatives to the details provided herein below are possible and should be considered within the scope of the disclosure.

The control channel in 3GPP REL 8 LTE may be contained in up to the first 3 symbols of a subframe. A subframe may consist of 2 slots, with each slot consisting of 7 OFDM symbols. This control channel may be referred to as PDCCH.

The PDCCH may be blindly decoded by a UE to find DCI matching its radio network temporary identifier (RNTI) or a broadcast RNTI. If a match is not found, the UE may be able to ignore the rest of the OFDM symbols in the subframe.

However, decoding of the PDCCH may take some time after the over the air (OTA) PDCCH OFDM symbols are received. For example, some receivers may wait for the 5th OFDM symbol (e.g., which may contain reference symbols) before starting the demodulation and attempted decoding of the PDCCH, and because multiple decoding hypotheses may be attempted, there may be an additional amount of processing time before it is determined if the attempted decoding is successful (e.g., when there is DCI matching a UE's RNTI or a broadcast RNTI) or unsuccessful (e.g., when there is no DCI for the UE). At least in some instances, it may be an objective to complete the PDCCH/DCI decoding within the first slot of a subframe to ascertain if the UE can ignore the OFDM symbols in the 2nd slot.

If a UE can make a determination within the 1st slot that it is not interested in any DL DCI contained in the PDCCH, it can possibly turn off parts of the modem, e.g., including parts of the RF chain, for most of the 2nd slot. This may be referred to as µSleep. The purpose of µSleep may be to save power. Such a µSleep feature that may be used by a UE may have no effect on the network, at least according to some embodiments.

The control channel in 3GPP REL 13 LTE for MTC UEs may be referred to as the M-PDCCH (e.g., MPDCCH or mPDCCH). The MTC devices may not monitor the PDCCH, at least according to some embodiments.

As one possibility, the PRB resources allocated for the mPDCCH may be selected from several specified possible sets of PRBs (e.g., {2, 4, 2+4}) in specified narrowband locations. In some instances (e.g., as further described in 3GPP TS 36.213, 9.1.5) two such sets may be specified.

Similar to downlink control information provided on the PDCCH, the DCIs provided on the MPDCCH may be blindly decoded by a UE to find a DCI matching its RNTI or a broadcast RNTI.

The MPDCCH for broadcast, paging, and contention resolution, may be sent on resources allocated for MPDCCH. This allocation may be referred to as common search space (CSS), e.g., as all MTC UEs that are not in the network may monitor the CSS.

Additionally, after a MTC UE enters the network, it may be assigned resources for the MPDCCH. This may be referred to as user specific search space (USS). A UE in the network may generally monitor its USS, e.g., in case there is DCI for the UE. The space assigned for USS may, however, be used by the network for other purposes, e.g., including USS for other UEs and/or PDSCH (i.e., no MPDCCH may be transmitted for the UE on some occasions).

The aggregation level L may define the redundancy in resources (in frequency space) used for DCI carried in a MPDCCH.

For coverage enhancement (CE) MTC UEs, the MPDCCH may extend over multiple subframes. Thus, the concept of repetition levels (R) (redundancy in time) may also be used.

Accordingly, for a MTC UE in a CE mode that utilizes such parameters, the search space for blind decoding may consist of a set of (L, R) values, along with start-locations.

The PRBs carrying the MPDCCH may include CRS, e.g., as such reference signals may be required for legacy UEs, at least according to some embodiments. However, the MPDCCH may use DMRS, so the CRS may not be required for channel estimation or demodulation of the MPDCCH.

As mentioned above, the PRBs assigned for the MPDCCH may be used for other purposes by the network and thus may not always actually carry the MPDCCH. Since in such instances it may be the case that DMRS may not be needed, one indication that a PRB-pair possibly does carry the MPDCCH may come from the presence of DMRS.

Furthermore, the DMRS in USS may be scrambled with a random sequence specific to a UE or a group of UEs, e.g., as further described according to some embodiments in 3GPP TS 36.211, section 6.10.3A.1. Thus, the presence of DMRS with a specific random sequence may hint at the presence of MPDCCH on PRB pairs which may be carrying USS MPDCCH.

As previously noted, the PDCCH may be based on/associated with CRS. Thus, the CRS may be used for channel estimation and demodulation for the PDCCH.

As also previously noted, the MPDCCH may be based on/associated with DMRS (see, for example, 3GPP TS 36.211, section 6.10.3A). The channel estimation and decoding for the MPDCCH may thus be based on the DMRS.

For distributed transmission, the REs may be transmitted according to the DMRS on ports 107 and 109 (see, for example, 3GPP TS 36.211, section 6.8B.5), e.g., as illustrated in FIG. 7.

For localized transmission, the REs may be transmitted according to the DMRS for a UE on one of the ports from the set {107,108,109,110} (see, for example, 3GPP TS 36.211, section 6.8B.5).

One idea behind DMRS detection may be to estimate the channel based on DMRS and then make a determination if the estimate represents a valid channel.

Several methods may be used for this determination based on, for example: the shape features of the CIR, and/or comparisons with the channel estimates based on CRS.

Different ports are specified in the 3GPP TS for various types of RS. In many instances, eNodeBs may be equipped with either two or four antennas. Thus, in such scenarios, all ports may use these antennas either individually or beamformed/pre-coded for RS/DMRS. Thus, the channel estimate based on CRS can give a good reference against which to judge the channel estimate obtained from DMRS. The following are examples of specific procedures that may be used:

As one possibility, let h_i be the interpolated/extrapolated channel estimates at the receiver based on CRS from the four eNodeB antennas, and let c be the channel estimate based on DMRS, then form correlation coefficients:

$$\rho_i = \frac{\langle c, h_i \rangle}{\|c\|\|h_i\|}, i = 0, 1, 2, 3$$

The UE may decide that DMRS is present if the magnitudes of one or more correlation coefficients are greater than some thresholds. Note that this procedure may assume that the eNodeB transmit antennas are uncorrelated.

As another possibility, the UE may compare the energies contained in the CIRs based on DMRS and CRS, and the noise variances, e.g., in the time domain.

In the following further exemplary embodiments are provided.

One set of embodiments may include an apparatus, comprising a processing element configured to cause a wireless device to: determine a first set of time-frequency resources associated with a control channel communication period of a cellular base station; determine whether a first type of reference signals are present in a first portion of the first set of time-frequency resources; and enter a reduced power mode for a second portion of the first set of time-frequency resources when the first type of reference signals are determined to not be present in the first portion of the first set of time-frequency resources, wherein the second portion of the first set of time-frequency resources is subsequent to the first portion of the first set of time-frequency resources temporally.

In some embodiments, to determine whether the first type of reference signals are present in the first portion of the first set of time-frequency resources, the processing element may be further configured to cause the wireless device to: perform channel estimation using resource elements of the first set of time-frequency resources that are associated with the first type of reference signals; perform channel estimation using resource elements of the first set of time-frequency resources that are associated with a second type of reference signals; and compare one or more characteristics of the channel estimation performed using the resource elements associated with the first type of reference signals and the channel estimation performed using the resource elements associated with the second type of reference signals.

In some embodiments, the processing element may be further configured to cause the wireless device to: determine one or more correlation coefficients between the channel estimation performed using the resource elements associated with the first type of reference signals and the channel estimation performed using the resource elements associated with the second type of reference signals; determine that the first type of reference signals are not present in the first portion of the first set of time-frequency resources if none of the one or more correlation coefficients are greater than a predetermined threshold; and determine that the first type of reference signals are present in the first portion of the first set of time-frequency resources if at least one of the one or more correlation coefficients is greater than the predetermined threshold.

In some embodiments, the processing element may be further configured to cause the wireless device to: compare channel impulse response energies and noise variances for the channel estimation performed using the resource elements associated with the first type of reference signals and the channel estimation performed using the resource elements associated with the second type of reference signals.

In some embodiments, to determine the set of time-frequency resources associated with the control channel communication period, the processing element may be further configured to cause the wireless device to: determine an aggregation level, a repetition level and a start location for the control channel provided by a cellular base station.

In some embodiments, a time duration of the first portion of the first set of time-frequency resources and a time duration of the second portion of the first set of time-frequency resources may be determined based at least in part on the repetition level for the control channel.

In some embodiments, the processing element may be further configured to cause the wireless device to attempt blind decoding of the control channel during the first set of time-frequency resources when the first type of reference signals are determined to be present in the first portion of the first set of time-frequency resources.

In some embodiments, a wireless device may, determine a set of resources associated with a control channel of a cellular base station; during a first period of time, determine whether a first type of reference signals is present in the set of resources; and select an operational mode for a second period of time, wherein the operational mode is selected based at least in part on the determination.

In some embodiments, the operational mode may be a low power mode when the determination is that the first type of reference signals is not present.

In some embodiments, the method may further comprise blind decoding of the set of resources associated with the control channel when the determination is that the first type of reference signals is present.

In some embodiments, determining whether the first type of reference signals is present may comprise: determining a first one or more channel estimates using resource elements associated with the first type of reference signals; determining a second one or more channel estimates using resource elements associated with a second type of reference signals; and determining one or more correlation coefficients between the first one or more channel estimates and the second one or more channel estimates.

In some embodiments, determining whether the first type of reference signals is present may further comprise: comparing the one or more correlation coefficients with at least one corresponding threshold, and determining that the first type of reference signals is present if at least one of the one or more correlation coefficients is greater than the at least one corresponding threshold.

In some embodiments, the first period of time may comprise the symbols of a first slot of a first physical resource block (PRB) pair.

In some embodiments, the second period of time may comprise a second slot of the first PRB pair.

In some embodiments, a wireless device, comprising: at least one processing element, and at least one radio operably coupled to the at least one processing element, may be configured to: determine resources associated with a first control channel communication period for a first control channel, wherein a first type of reference signals is associated with the first control channel; determine that the first type of reference signals is absent over a first portion of the first control channel communication period; and based at least in part on the absence of the first type of reference signals over the first portion of the first control channel communication period, enter a low power mode for a second portion of the first control channel communication period.

In some embodiments, the wireless device may be further configured to: determine resources associated with a second control channel communication period for the first control channel; determine that the first type of reference signals is present over a first portion of the second control channel communication period; and based at least in part on the presence of the first type of reference signals over the first portion of the second control channel communication period, attempt blind decoding of the first control channel during the second control channel communication period.

In some embodiments, the wireless device may be further configured to: determine a search space of the control channel; and set a duration of at least one of the first portion of the first control channel communication period and the second portion of the first control channel communication period based at least in part on the search space of the control channel.

In some embodiments, the search space of the control channel may be determined based at least in part on configuration information indicating one or more of an amount of frequency domain search space redundancy, an amount of time domain search space redundancy, or search space start locations.

In some embodiments, the wireless device may be a wearable device.

In some embodiments, the control channel may be machine-type communication physical downlink control channel (MPDCCH).

In some embodiments, the first type of reference signals comprises demodulation reference symbols (DMRS).

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a wireless device to:
determine a first set of time-frequency resources associated with a control channel communication period of a cellular base station;
determine whether a first type of reference signals is present in a first portion of the first set of time-frequency resources; and
enter a reduced power mode for a second portion of the first set of time-frequency resources when the first type of reference signals is determined to not be present in the first portion of the first set of time-frequency resources, wherein the second portion of the first set of time-frequency resources is subsequent to the first portion of the first set of time-frequency resources temporally.

2. The apparatus of claim 1, wherein to determine whether the first type of reference signals is present in the first portion of the first set of time-frequency resources, the processor is further configured to cause the wireless device to:

perform a first channel estimation using resource elements of the first set of time-frequency resources that are associated with the first type of reference signals;

perform a second channel estimation using resource elements of the first set of time-frequency resources that are associated with a second type of reference signals; and compare one or more characteristics of the first channel estimation performed using the resource elements associated with the first type of reference signals and the second channel estimation performed using the resource elements associated with the second type of reference signals.

3. The apparatus of claim 2, wherein the processor is further configured to cause the wireless device to:

determine one or more correlation coefficients between the first channel estimation performed using the resource elements associated with the first type of reference signals and the second channel estimation performed using the resource elements associated with the second type of reference signals;

determine that the first type of reference signals is not present in the first portion of the first set of time-frequency resources if none of the one or more correlation coefficients are greater than a predetermined threshold; and determine that the first type of reference signals is present in the first portion of the first set of time-frequency resources if at least one of the one or more correlation coefficients is greater than the predetermined threshold.

4. The apparatus of claim 2, wherein the processor is further configured to cause the wireless device to:

compare channel impulse response energies and noise variances for the first channel estimation performed using the resource elements associated with the first type of reference signals and the second channel estimation performed using the resource elements associated with the second type of reference signals.

5. The apparatus of claim 1, wherein to determine the first set of time-frequency resources associated with the control channel communication period, the processor is further configured to cause the wireless device to:

determine an aggregation level, a repetition level and a start location for the control channel provided by a cellular base station.

6. The apparatus of claim 5, wherein a time duration of the first portion of the first set of time-frequency resources and a time duration of the second portion of the first set of time-frequency resources are determined based at least in part on the repetition level for the control channel.

7. The apparatus of claim 1, wherein the processor is further configured to cause the wireless device to:

attempt blind decoding of the control channel when the first type of reference signals is determined to be present in the first portion of the first set of time-frequency resources.

8. A wireless device, comprising:

at least one processor, and at least one radio operably coupled to the at least one processor, wherein the wireless device is configured to:

determine resources associated with a first control channel communication period for a first control channel, wherein a first type of reference signals is associated with the first control channel;

determine that the first type of reference signals is absent over a first portion of the first control channel communication period; and based at least in part on the absence of the first type of reference signals over the first portion of the first control channel communication period, enter a low power mode for a second portion of the first control channel communication period.

9. The wireless device of claim 8, wherein the wireless device is further configured to:

determine resources associated with a second control channel communication period for the first control channel;

determine that the first type of reference signals is present over a first portion of the second control channel communication period; and based at least in part on the presence of the first type of reference signals over the first portion of the second control channel communication period, attempt blind decoding of the first control channel during the second control channel communication period.

10. The wireless device of claim 8, wherein the wireless device is further configured to:

determine a search space of the first control channel; and set a duration of at least one of the first portion of the first control channel communication period and the second portion of the first control channel communication period based at least in part on the search space of the first control channel.

11. The wireless device of claim 10, wherein the search space of the first control channel is determined based at least in part on configuration information indicating one or more of an amount of frequency domain search space redundancy, an amount of time domain search space redundancy, or search space start locations.

12. The wireless device of claim 8, wherein the low power mode comprises a sleep state.

13. The wireless device of claim 8, wherein the control channel comprises machine-type communication physical downlink control channel (MPDCCH), wherein the first type of reference signals comprises demodulation reference symbols (DMRS).

14. A non-transitory computer accessible memory medium storing program instructions executable by a processor of a wireless device to:

determine a first set of time-frequency resources associated with a control channel communication period of a cellular base station;

determine whether a first type of reference signals is present in a first portion of the first set of time-frequency resources; and enter a reduced power mode for a second portion of the first set of time-frequency resources when the first type of reference signals is determined to not be present in the first portion of the first set of time-frequency resources, wherein the second portion of the first set of time-frequency resources is subsequent to the first portion of the first set of time-frequency resources temporally.

15. The non-transitory computer accessible memory medium of claim 14, wherein to determine whether the first type of reference signals is present in the first portion of the first set of time-frequency resources, the processor is further configured to cause the wireless device to:

perform a first channel estimation using resource elements of the first set of time-frequency resources that are associated with the first type of reference signals;

perform a second channel estimation using resource elements of the first set of time-frequency resources that are associated with a second type of reference signals; and compare one or more characteristics of the first channel estimation performed using the resource elements associated with the first type of reference signals and the second channel estimation performed using the resource elements associated with the second type of reference signals.

16. The non-transitory computer accessible memory medium of claim 15, wherein the program instructions are further executable to cause the wireless device to:

determine one or more correlation coefficients between the first channel estimation performed using the resource elements associated with the first type of reference signals and the second channel estimation performed using the resource elements associated with the second type of reference signals;

determine that the first type of reference signals is not present in the first portion of the first set of time-frequency resources if none of the one or more correlation coefficients are greater than a predetermined threshold; and determine that the first type of reference signals is present in the first portion of the first set of time-frequency resources if at least one of the one or more correlation coefficients is greater than the predetermined threshold.

17. The non-transitory computer accessible memory medium of claim 15, wherein the program instructions are further executable to cause the wireless device to:

compare channel impulse response energies and noise variances for the first channel estimation performed using the resource elements associated with the first type of reference signals and the second channel estimation performed using the resource elements associated with the second type of reference signals.

18. The non-transitory computer accessible memory medium of claim 14, wherein to determine the first set of time-frequency resources associated with the control channel communication period, the processor is further configured to cause the wireless device to:

determine an aggregation level, a repetition level and a start location for the control channel provided by a cellular base station.

19. The non-transitory computer accessible memory medium of claim 18, wherein a time duration of the first portion of the first set of time-frequency resources and a time duration of the second portion of the first set of time-frequency resources are determined based at least in part on the repetition level for the control channel.

20. The non-transitory computer accessible memory medium of claim 14, wherein the program instructions are further configured to cause the wireless device to:

attempt blind decoding of the control channel when the first type of reference signals is determined to be present in the first portion of the first set of time-frequency resources.

* * * * *